United States Patent Office 3,561,008
Patented Feb. 2, 1971

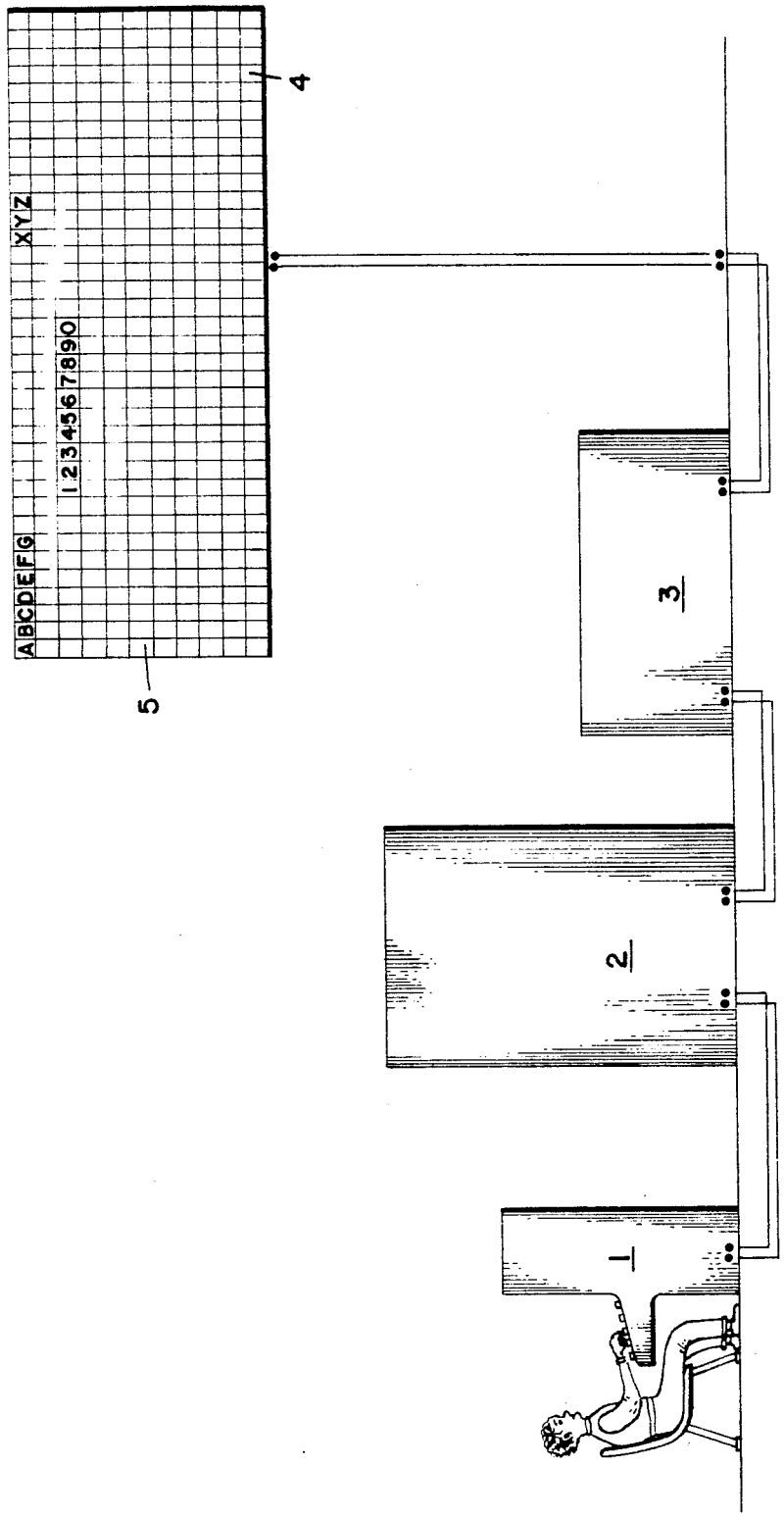

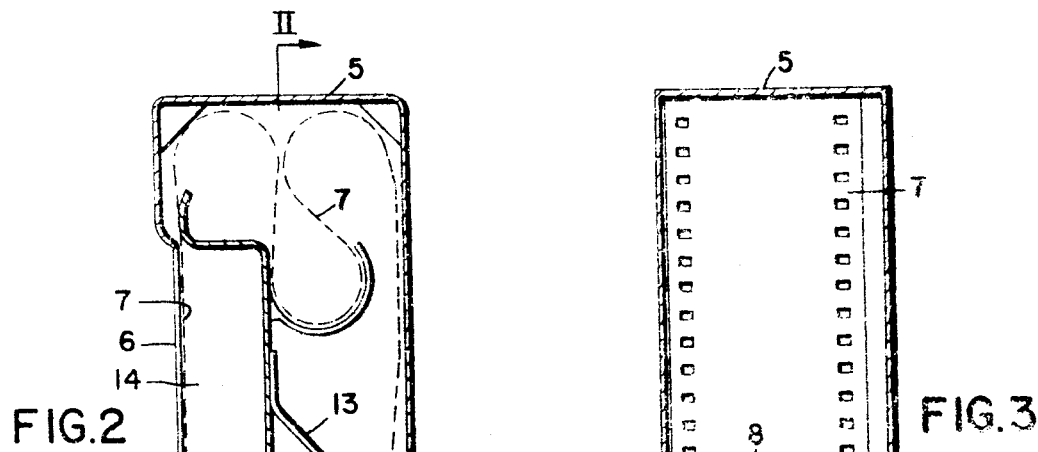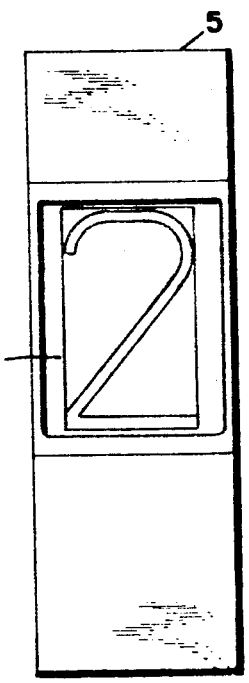

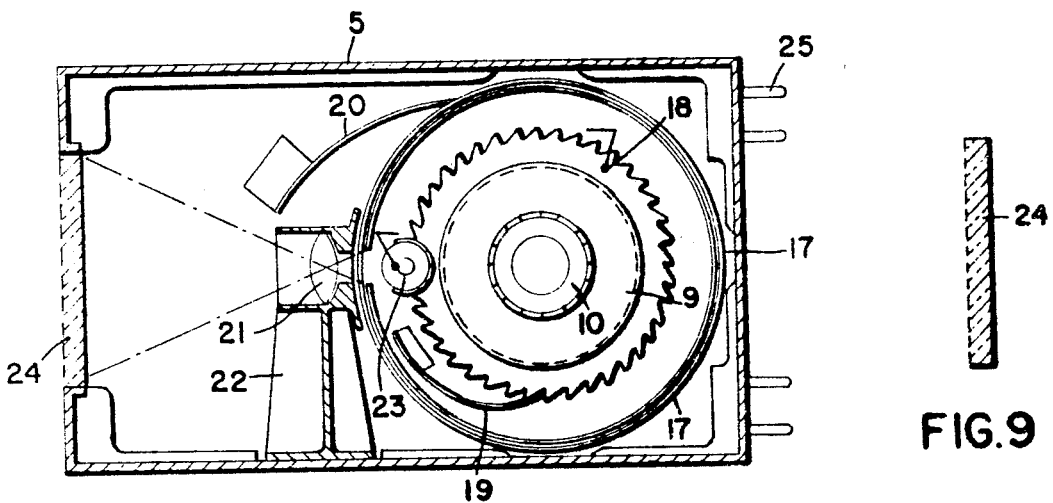
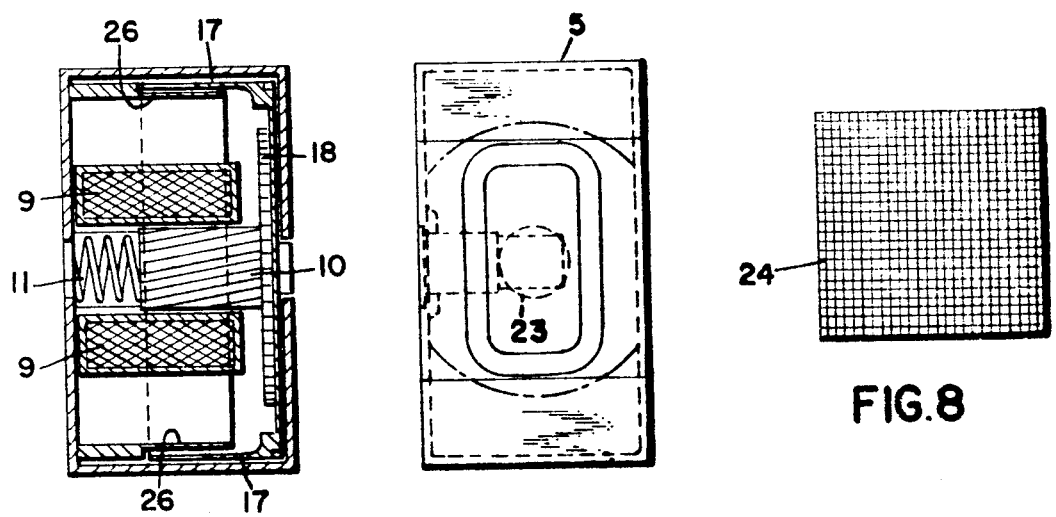
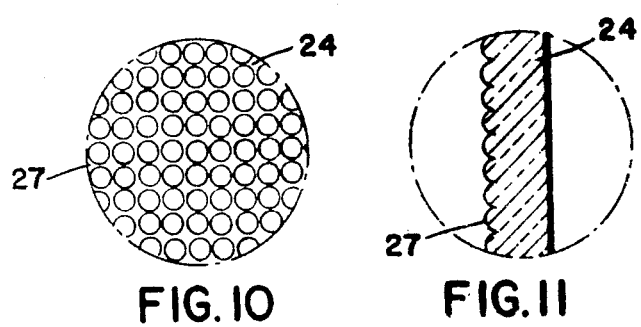

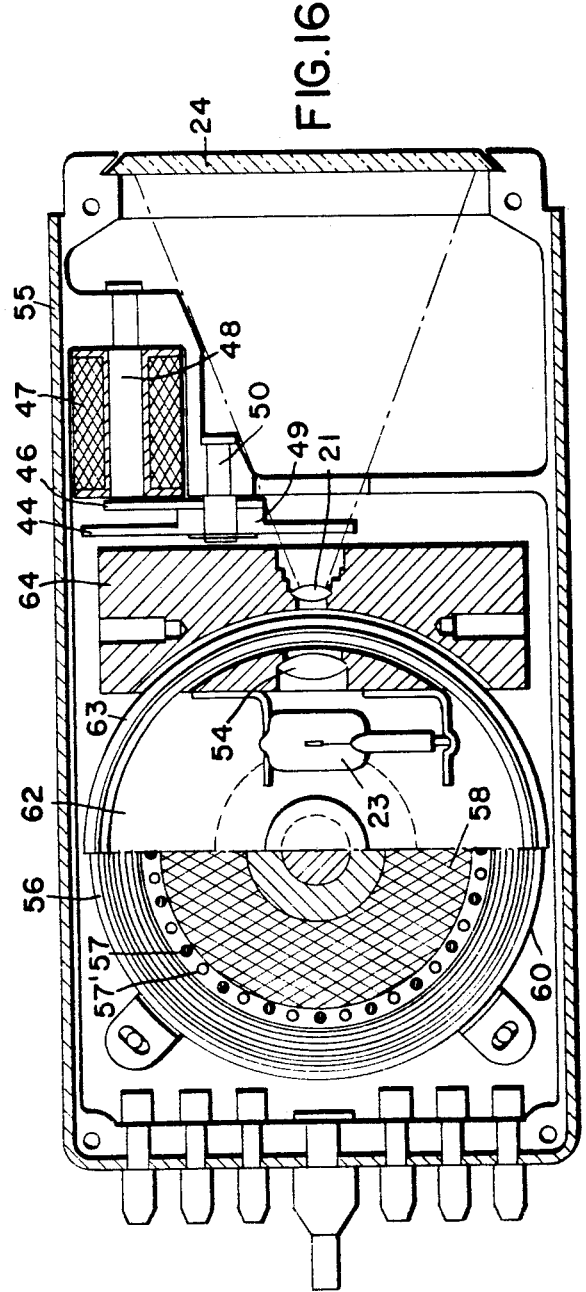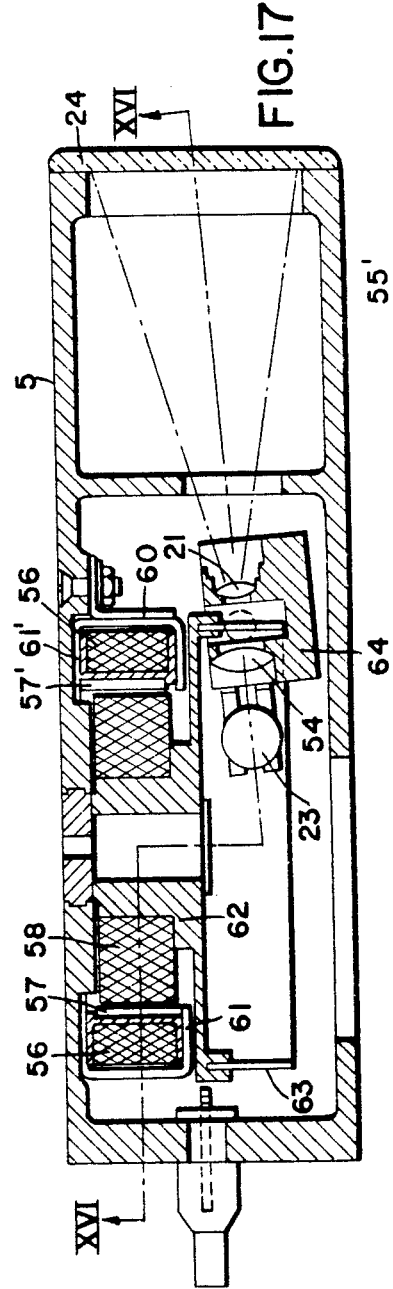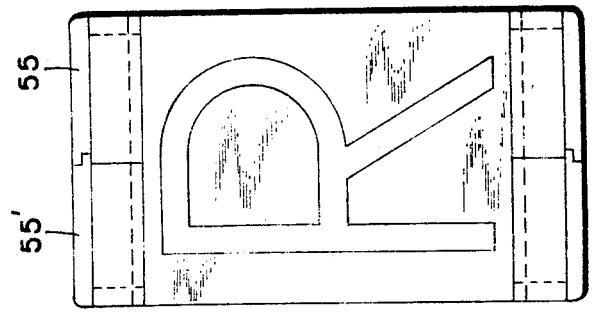

3,561,008
REMOTE CONTROLLED ILLUMINATED DISPLAYS
Edgard Nazare, 129 Rue de l'Universite,
Paris 7, France
Continuation of application Ser. No. 564,669, July 12, 1966. This application July 16, 1969, Ser. No. 846,639
Claims priority, application France, July 12, 1965, 24.352; Sept. 17, 1965, 31,706; Nov. 26, 1965, 39,917; July 6, 1966, 68,405
Int. Cl. G08b 5/24
U.S. Cl. 340—379      4 Claims

ABSTRACT OF THE DISCLOSURE

This invention relates to a remotely-controlled display system and, more particularly, to such a system wherein the elements of display are mounted on movable elements operated by pulse-energized actuators.

This application is a continuation of Ser. No. 564,669 filed July 12, 1966, now abandoned.

The display of changeable information, such as the price of shares on the stock exchange, air transport, and railway train schedules, and winning numbers at race tracks and lotteries, is practised more and more in our time and is increasingly important in modern living. However, the problem of arranging such a display has been satisfactorily solved, up to the present time, only in the cases where a small number of indicia are to be changed. For example, on the display boards of the stock exchange, the names of the companies quoted are inserted permanently and only the price quotations vary. Furthermore, the existing systems do not permit one to view on the same board any random combination of words and/or numbers whatever. Thus, the only devices which could be considered as satisfactory operate only within certain limits of use. For example, systems having rotatable shutters can serve solely for the display of full predetermined words; they do not permit the display of a word not conceived in advance, nor do they permit rapid modification of the combination of displayed letters. If such a modification were required, it was necessary to dismantle a part of the device and insert a new word. Generally speaking, the systems in use at the present are characterized by functioning slowly and are, for that reason, inadequate. More and more it is necessary to display information which arrives in a very short time, say, in the order of a millisecond. These and other difficulties experienced with the prior art devices have been obviated in a novel manner by the present invention.

It is, therefore, an outstanding object of the invention to provide a remote control display system which can produce in a very short time any combination of letters, numbers, and symbols; a word or an entire phrase can be displayed that had never been conceived for the given display board.

Another object of this invention is the provision of a remote control display system which is very rugged, in which the use of mechanical parts is reduced to a minimum, that experiences practically no wear, and which requires practically no maintenance, this being in contrast with the existing devices which require practically constant attention.

A further object of the present invention is the provision of a remote control display system which can function for tens of thousands of hours without interruption.

It is another object of the instant invention to provide a remote control display system which can be readily manufactured from interchangeable parts and assemblies, the replacement of which is quickly effected.

It is a further object of the invention to provide a display system consisting of a plurality of juxtaposed elements, each of which can be remotely controlled to make a symbol appear, the assembly of symbols forming a required combination.

A still further object of this invention is the provision of a display system made up of individually-changeable elements which are remotely controlled by electronics.

It is a still further object of the present invention to provide a remote control display system including optical and lighting means to give illuminated pictures of the signs to be displayed.

Another object of the invention is the provision of a display having a drive means to bring symbols, with which juxtaposed members are provided, into viewing positions.

Another object of the invention is the provision of a display system having remotely changeable color means associated with displayed symbols.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

FIG. 1 shows a diagram of a remote control display system embodying the principals of the present invention, FIG. 2 is a side view of a display member forming part of the system, FIG. 3 shows the same member in vertical section, FIG. 4 is a front view of the member, FIG. 5 shows a vertical sectional view of another embodiment of the invention, FIG. 6 is a section along the line V—V of FIG. 5, FIG. 7 shows a symbol seen from the front in a window of the embodiment of FIGS. 5 and 6, FIGS. 8 and 9 are, respectively, views from the front and in transverse section of a screen associated with the window of the embodiment of FIGS. 5 to 7, FIGS. 10 and 11 show parts of FIGS. 8 and 9, respectively, on a very much enlarged scale, FIG. 12 is a longitudinal section of another embodiment, taken on the line XIII—XIII of FIG. 13, FIG. 13 is a sectional view, taken on the line XII—XII of FIG. 12, FIG. 14 is a longitudinal section of the embodiment of FIGS. 12 and 13 provided with a color-changing system, FIG. 15 is a vertical section taken on the line XIV—XIV of FIG. 14, FIG. 16 is a vertical sectional view of a different remote control display member, taken on the line XVI—XVI of FIG. 17, FIG. 17 is a horizontal section of the member, FIG. 18 is a front view of a symbol displayed by the member of FIGS. 16 and 17, FIG. 19 is a fragmentary axial section of the casing of a motor forming part of the member shown in FIG. 17, FIG. 20 is a fragmentary section of the motor coil, FIG. 21 is a fragmentary elevation of the coil, FIG. 22 is an axial sectional view of a memory device forming part of the system, FIG. 22a is a perspective view of the memory device, FIG. 23 is an electrical circuit diagram associated with the memory device, FIG. 24 is a plan view of a computer forming part of the invention, and FIG. 25 is a partial side view of the computer.

In general, the invention consists of a display system using differing symbols and comprising a board composed of juxtaposed display members. Each such member carries symbols capable of replacing one another and is provided with means for effecting this replacement by remote control. Each of the said members comprises a movable surface provided with a succession of required symbols and with remotely controlled motorized means for moving the said surface, so that the required symbol appears behind a window provided in the board.

The movable surface may be a flexible band on which the symbols (such as letters or figures) are disposed along its length. The band may be opaque or transparent and the signs may be printed, painted, engraved, raised, or cut out, so to be seen in a corresponding window of the board by an observer in front of the board. The band can be endless and moved by two rollers and the movement may be effected by means of a rotatable drum, the band being disposed on the periphery of this drum.

As motorized means for producing the required displacements of the movable surface, any known type such as an electric motor may be used; however, the display system of the invention gives particularly good results when these displacements are produced by a stepping motor which rotates through a small predetermined angle upon receipt of an electrical pulse.

The stepping motor has a substantially flat frame and pole pieces of cylindrical form which are mounted alternately on the side walls of the frame; the stator of the motor has flutings to serve as guides for the said pole pieces. The frame, the stator with its flutings, and the pole pieces form the induction member of the motor. This member cooperates with an annular magnet which drives an entrainment means for the band or drum.

In one preferred form of embodiment the symbols are transparent on an opaque band and the part of the band located behind the window of the display board is lighted from behind, so as to produce an illuminated display. In this case, a source of light is provided inside the display member and it is situated in such a manner that the band is arranged between it and the window.

An alternative form of the invention permits the display of signs of large dimensions by means of small display members, carried on the band, which can accommodate a large number thereof. In this embodiment, an optical system is installed inside the display member to project an enlarged image of a given sign on a screen placed in the window of the board. The optical system is provided with a number of lenses, prisms, and mirrors. A lens is situated between the band and the screen of the window, and a lamp is arranged behind the band. Preferably, a condenser lens is provided between the lamp and the band. Of course, the position of the lamp may be varied and the light can be directed adequately by a system of prisms and mirrors.

In accordance with a further embodiment of the invention, the display members are provided with a device for modifying the color of the displayed illuminated sign. Such a device comprises a rotatable disc which carries a series of colored, transparent filters and motor means for turning the disc. This latter is mounted inside of the display member in such a manner that each of the colored filters may be brought into a predetermined position in the path of the light rays coming from the source of light of the member to the window.

Although the stepping motor, in accordance with the invention, can be controlled directly by means such as a telephone-type dial or an electric typewriter, the new system can be easily controlled by a computer which considerably enlarges the possibilities of use of remotely-controlled displays.

A further embodiment is constituted by the symmetrical juxtaposition on the same axis of two impulse motors of the same type as the motor described above. Each of these has a series of contacts arranged around a drum. The order to be transmitted to the display members is registered by one of the two motors. Then, it is transmitted at the required time by the operation of the second motor, the rotor of which carries a brush which traverses the contacts of its own motor; the second motor stops when its brush arrives at a predetermined mark in the contacts of the first motor.

The remote control of the display members can be made in a pre-established order by means of a sequence switch located between the members and the control means. A suitable form of sequence switch comprises a frame in which a series of contact pins slide diagonally with respect to one another and which are connected by conductor clips at their intersections. The pins comprise alternate conductive and non-conductive rings.

Referring first to FIG. 1, wherein are best shown the general features of the invention, the remote controlled display device is shown as comprising a control station having one or more conventional manual devices, such as impulse dials of the telephone type. This station controls directly and separately display members 5 of a display board 4. Each of the members 5 is provided with a stepping motor which rotates a carrying drum for the 26 letters of the alphabet, for the numbers 0 to 9, and for four diverse symbols, for example, 40 in all. With the help of a 40-position impulser, the display in the window of the member 5 of any one of the 40 symbols can be produced. If it is required, for example, to display on the board 4 the inscription "ABCDE," the first member 5 is produced by means of one impulse (gives A), the second member with 2 impulses (giving B), the third with 3 impulses (giving C), etc.

This simple arrangement is suitable when the total number of symbols which have to appear on the board is small. However, the invention permits a large number of combinations, making possible the display of whole phrases, messages, calls, etc. if necessary, and this can be effected by a direct manual control system, or indirectly with automatic means, by using punched cards or the like. In the direct system, the station 1 directly controlling the members 5 of the board 4 can have only one impulse dial, having 40 positions, but it also comprises a hand switch for switching into circuit the vertical columns of the members 5 of the board 4; a similar switch is provided for the horizontal lines of these members as well as buttons for partial and full return to zero. These diverse parts are not shown and are not described, but they are well known in remote control technique.

The indirect automatic system with manual intervention, comprises the keyboard of an electric typewriter for typing messages and a band or card perforator. There are two switches for each display board serving for the manual selection of the horizontal lines of the members 5. Buttons are provided for controlling the storage means 2; a switch is provided for the columns of the members 5; and a group of decoders is provided for registering the symbols in the storage 2; a remote control is provided for the color-changing device, if desirable.

The reference numeral 3 in FIG. 1 designates a computer which gives an instantaneous display of a whole series of symbols which were previously punched out at 2.

FIG. 2 shows a vertical section of a display member 5, the window 6 of which constitutes one of the windows of the display board. The symbols to be displayed are arranged on a film 7 moved by a drum 8. FIG. 3, which is a vertical section along the line II—II of FIG 2, shows the actuating motor for the film. The impulse motor comprises an electro-magnet winding 9 with a helically grooved core 10. Springs 12 play the part of double pawls in conjunction with the internal teeth 16 of the drum 8; outside, the drum carries the forwarding teeth 15 for the film. The grooves of the core slide in the grooves of the tubular part of the coil. A spring 11 pushes the core outwardly to maintain it in the "rest" position. The passage of current through the coil attracts the core and this slides in, turning through a corresponding angle in the thread of the helix. The pawl 12 moves the drum 8 in a corresponding direction, making it rotate through the same angle. The interruption of current through the coil frees the core from magnetic attraction and the spiral spring 11 pushes it back to its rest position. In taking up this position, the pawl 12 escapes from the teeth of the drum. The device may act in reverse; the energization of the coil can, in attracting the core, effect the escape of the pawl and, during return to the rest position, move the drum. In either case, a pawl 13 prevents reverse motion of the drum.

Behind the window 6, a chamber 14 contains an illuminating system which gives viewing of the displayed sign, if made as a transparency.

To reduce the volume of the casing containing the mechanism and the film 7, this latter comprises free loops or guides. The motor can be incorporated in the drum, as is shown in the drawing, or placed outside the drum, or even outside the casing 5. On the other hand, the actuating system for the film can be a continuously rotating motor.

It is possible to control a whole group of members by a single-impulse or continuously rotating motor. In this case, the members are connected to each other by means of toothed gears cooperating one with the other, as in mechanical calculating machines.

The film may carry perforations or bosses such that, by its displacement, it makes and breaks a contact by means of brushes or wipers. The code corresponding to each symbol stops the film on the desired sign, or transmits an order onto another block of members, or even transmits the position of the film to another group of storages. Similarly, the contacts can be arranged in such a manner that they are controlled by the actuating drum of the film, if so provided.

In the embodiment of a remote control display member 5, shown in FIGS. 5 and 6, the motor used is the same as that of FIGS. 2 and 3, but the endless film 7 is replaced by a drum 17 carrying the required symbols, which are transparent.

Movement of the drum 17, the axis of rotation of which is concentric with the core 10, is obtained by the intermediary of a ratchet wheel 18; a pawl spring 19 integral with the drum permits this latter to turn only in the escapement direction; another pawl spring 20 fixed to the wall of the member 5 maintains the drum accurately located with respect to the axis of projection of the signs.

When an electric current impulse is received by the coil of the electro-magnet 9, the core 10 is drawn by the resulting magnetic field and turns through a corresponding angle in the thread of its helical grooves. When the core 10 and the ratchet wheel 18 are moved, the drum is held by the spring 20 and does not turn, but the ratchet wheel moves one tooth under the pawl 19. When the current stops, the spring 11 pushes back the core and the wheel to bring them back to zero, at this time the ratchet wheel 18 is blocked by the pawl 19, so that the drum 17 moves one tooth under the spring 20, and so on. The orientation of the teeth of the drums and wheels or those of the grooves of the core can be reversed, so that the rotation of the drum takes place in the "working" position instead of the "rest" position.

A projection lens 21 mounted on a support 22 is arranged on the optical axis of the sign which is inscribed on the drum; a lamp 23 behind the sign illuminates this transparency, the lens enlarges the image and projects it on the screen 24. This latter consists of a plate of glass, plastic sheet, or other transparent material; the internal face is frosted and the external face comprises a plurality of micro-lenses. The references 25 represent the electric connections from the assembly to a distribution connector for the circuits, and the light. An optical screen 26 fixed to the wall of the casing 5 is concentric with the inside of the drum 17; it prevents the diffusion of the light outside the field of the image and serves as an abutment for axial displacement of the drum.

FIG. 7 shows a sign (letter O) enlarged optically projected on the screen 24; the lamp 23 is shown dotted and arranged in the optical axis of the system.

FIGS. 8 and 9 are front and side views of the screen 24.

FIGS. 10 and 11 are the same views, but fragmentary, and on an enlarged scale give details of the micro-lenses 27 comprising this screen.

Figure 12:
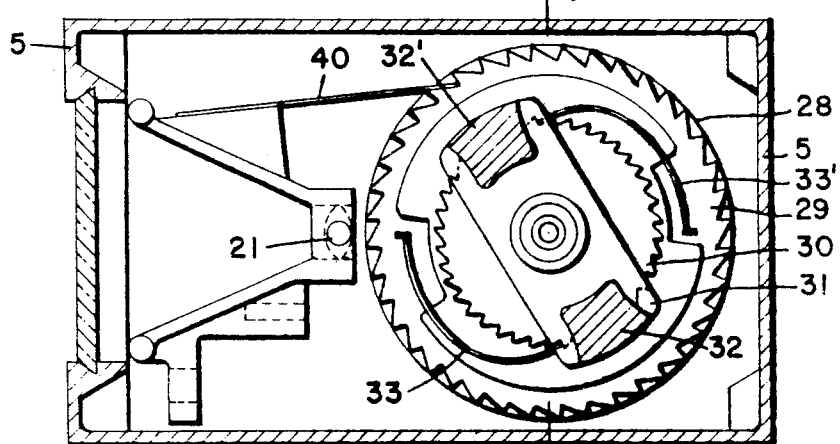
Figure 14:
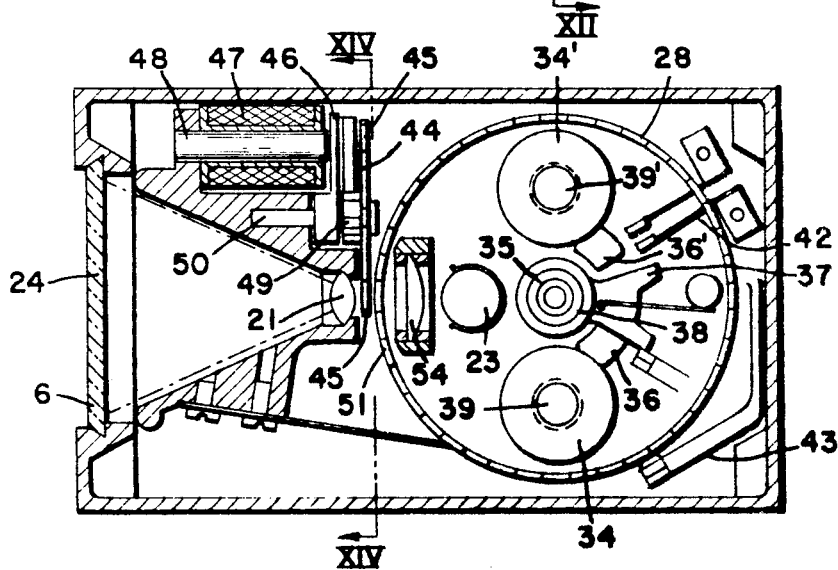
Figure 13:
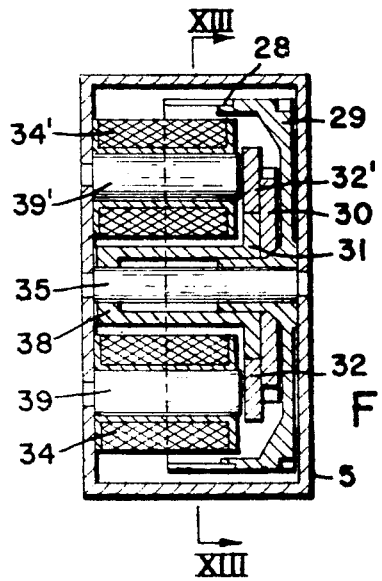

FIGS. 12 to 14 show an alternative embodiment in which the drum 28 carrying the signs to be displayed forms part of ratchet wheel 29; a film with signs cut out (not shown) is wound and centered on the drum 28. A ratchet wheel 30 is stepped by leaf springs 33 and 33' secured to the wheel 29. At 31 there is a solenoid, shown with two pole pieces 32 and 32', but which can have one or more of such pole pieces; the solenoid 31 is secured to the wheel 30. Two coils 34, 34' etc., having cores 39, 39', the number of which can likewise vary, are arranged parallel to the axis of the mounting 35 common to the wheels 29, 30 and to the coil 31.

In FIG. 14, which is a view to the left of a section of FIG. 13 through a vertical plane XVIII—XVIII, there can be seen the abutments 36, 36' and the pivoting piece 37 wedged on the axis 38'; the system of abutments 36, 36', 37 asserts the movement of the solenoid 31 and limits the ratchets of the wheel 30.

To operate the remote control display member of FIGS. 12 to 14, each coil 34, 34' is impulsed so that the solenoid core 31 drawn by the cores 39, 39' etc. makes the blade 40 engage a tooth of the drum 29. When the solenoid core comes back to its rest position, a tooth of the wheel 30 is engaged; thus, the reciprocating movement of the solenoid 31 drawn by the cores 39, 39' etc. at each impulse effects rotation of the drum 28, step by step. Contacts 42 and 43 are provided for self-interruption and return to zero in known manner.

Figure 15:
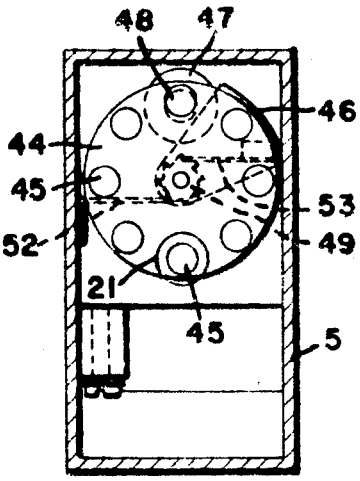

FIGS. 14 and 15 show a device for changing the color of the sign to be displayed. FIG. 15, which is a vertical section of the remote control display member through a plane XIV—XIV of FIG. 14 seen towards the left, is a front elevation of this device, while FIG. 14 is an axial section. The change of color is produced by colored screens 45 on rotatable disc 44, each of which can be located in the path of light from the sign 51 of the film on the drum 28 to the screen 24 of the window 6 on the element 5.

The rotation of the disc 44 to move a screen 45 of the desired color before the sign 51 is achieved by a reciprocating movement of a sector 46 induced by the core 48 of a coil 47. The sector 46 is fixed on the same axis 50 as the disc 44, and a ratchet wheel 49, one part of which engages with a holding leaf spring 52, is fixed to the wall of the member 5 with a spring 53 secured to the sector 46. Under the effect of an impulse in the coil 47, the system 46, 49, 52, 53 causes the disc 44 to turn step-by-step in a manner analogous to that by which rotation of the drum is produced by means of the assembly 34, 34', 31, 30, 33, 33', as was explained above. The member of FIG. 14 is provided with an optical system comprising, in addition to the lens 21, a condenser 51 fixed between the lamp 23 and the film 51 inside the drum 28.

Figure 20:
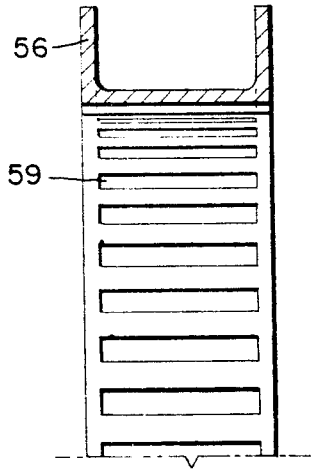
Figure 21:
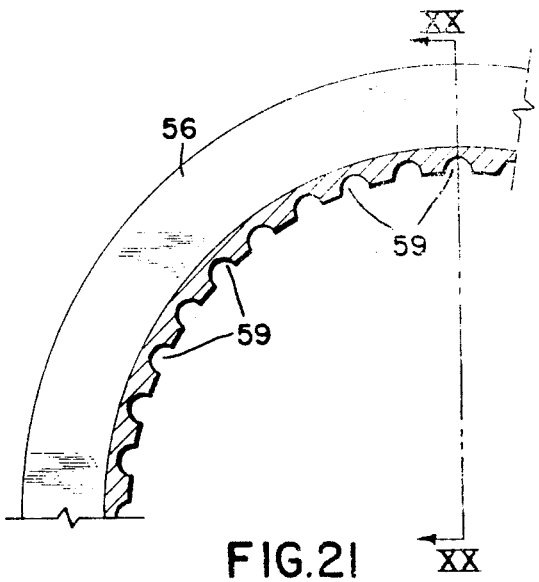
Figure 19:
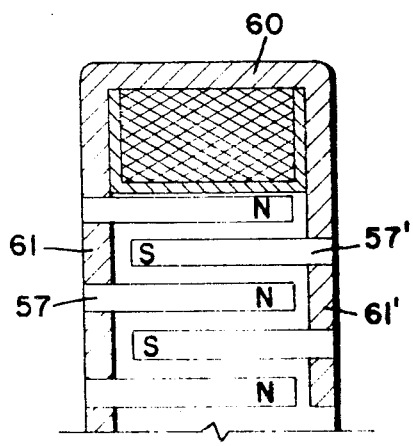

FIGS. 16, 17, and 18 show a remote control display member, of which the casing comprises two half-shells 55 and 55'. The mechanism of this member comprised a new form of impulse motor. This motor, of which an axial section is shown in FIG. 17 and a transverse section on the left of the plane XVI—XVI of FIG. 16, comprises a flat chassis 60 in which there is arranged a coil 56 of an electro-magnet. The side walls 61 and 61' of the chassis 60 carry cylindrical pole pieces 57 and 57' which bind a sort of double rack having mutually engaging teeth, between the coil 56 and the field member 58 formed as a magnetic ring. The coil comprises flutings 59 serving as guides for the pole pieces 57, 57', as can be better seen in FIGS. 19 to 21. The ring 58 may have as many magnetic poles as the inductance 56, 57, 57', 60 has of cylindrical pole pieces 57, 57'. The rotor 58 is coaxially secured to a drum 62, of which the crown 63 which is arranged in the right-hand half shell 55' of the casing, carries the band on which are inscribed the symbols to be displayed.

It is seen that the left-hand half 55 of the member contains the motor proper, while the band with the symbols and the optical system 21, 23, 54 occupies the right-hand half 55' from where the image of the symbol is projected on the screen 24. The optical system is mounted on a support 64 allowing it to orientate and center the image on the screen.

To operate this device, the coil 56 is excited by a continuous current in a given direction; at this time, half of the cylindrical pieces 57 of the field are polarized N and the other half (57') S. The rotor is polarized in the same way, and it is arranged, therefore, that all the N field poles and S rotor poles are coincident, since opposite magnetic poles attract; the torque thus operates simultaneously on all the poles at once. If the polarity of the current is now reversed, the polarity of the poles of the field are reversed; the rotor, therefore, moves to a new position by displacing itself to bring the N–S and S–N poles once more into coincidence. The rotor is biased in a convenient manner either by a resistance-capacity shunt or by a ratchet to a predetermined direction of rotation, so that it always turns in the same direction as long as the electrical or mechanical biasing is not altered. The aim of this motor is to use no anti-magnetic mounting, brass, for example, but to employ a chassis directly fixed on the half casing 55, which is, therefore, an element of the body of the motor; it has cylindrical poles and a rotor 58 secured to the film carrying drum 62, 63; by this design, it can be housed in a space of minimum thickness. Such an assembly constitutes an assembly in which the number of parts is reduced to the minimum possible.

Figure 22:
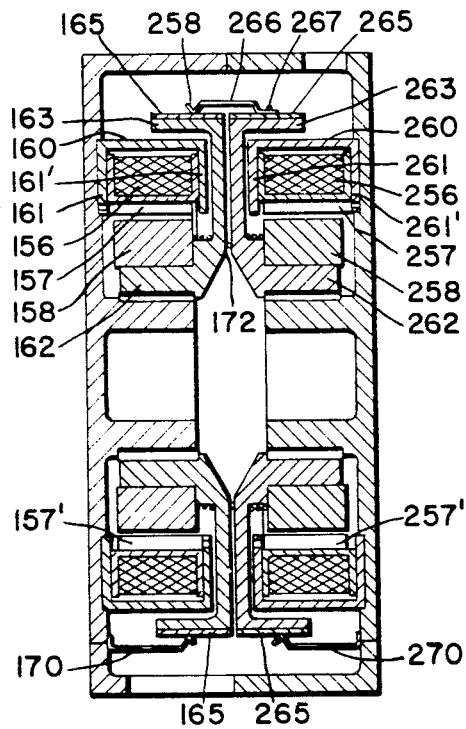
Figure 23:
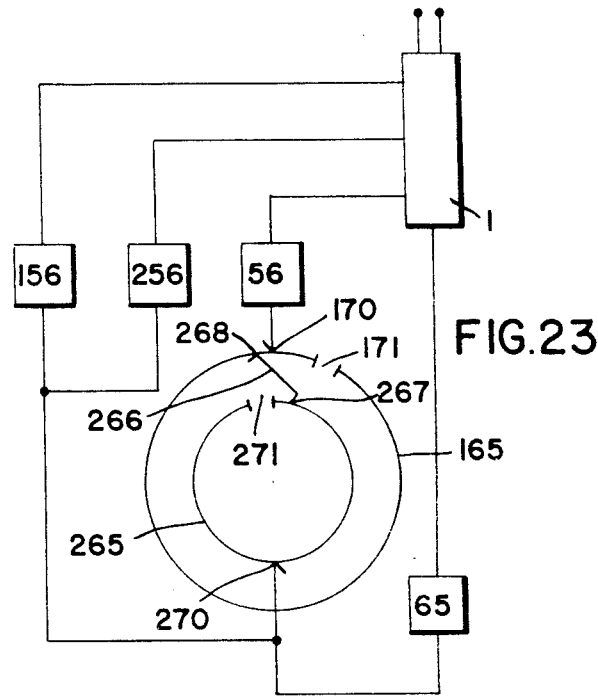

FIGS. 22 and 23 show an apparatus constructed by the combination of two motors of the type shown in FIGS. 16 and 17. This apparatus, in accordance with the invention, is a memory device which is suitable for many uses; it is especially useful in indirect remote control display systems in accordance with the invention described above in connection with FIG. 1 or the storage shown at 2.

Figure 22A:
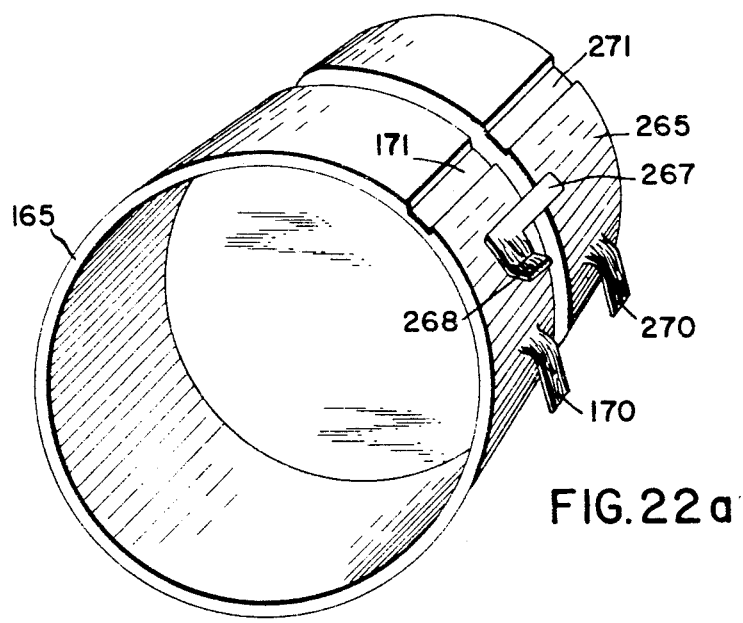

Two motors I and II of FIG. 16 (or 17) shown in axial section in FIG. 22 are juxtaposed symmetrically on the same axis, shown horizontally on the drawings. The different parts 56 to 63 described above are for the motors I and II of FIG. 22, respectively, coils 156 and 256, cylindrical pole pieces 157, 157' and 257, 257', rotors 158 and 258, chassis 160 and 260, side walls 161, 161' and 261, 261', drums 162 and 262, drum crown 163 and 263. The peripheral surface of the crowns of the drums is covered with a layer of good electrically conductive material, for example, electrolytically deposited chromium, forming contact tracks 165 and 265, each interrupted at one point, respectively 171 and 271, as is schematically shown in FIG. 22a.

The drums 162 and 262 are able to turn independently without any mutual mechanical movement; abutment bearings 172 maintain the distance between the drums. A brush 266 fixed at 267 to the drum 262 moves its end 268 over the contact track 165 of the motor I. Neither the supplies of the two motors nor the external circuits of operation comprising the tracks 165 and 265 are shown, as they are evident to anyone skilled in this art.

In the use of this apparatus, the motor I plays the part of a memory device and the motor II that of a searcher. When it is required to put an order into the memory device for one or more of the members 5 or 55, 55' for the display of a sign, for example, the letter "G," the corresponding number of impulses, in this case 7, are set from the station 1 by one of the several means disclosed in connection with FIG. 1. This effects rotation of the drum 162, 163 through a certain angle corresponding to 7 impulses; that is to say, to the symbol "G"; consequently, the break 171 in the track of the contact 165 is displaced through an arc *g* with respect to it zero starting position. The drums of the motors I and II thus displaced one with respect to the other can remain in this new position for as long as required.

At a selected moment where it is necessary to retransmit to the remote controlled display members the order "G" put into the memory device in the motor I, it is sufficient to close the two circuits shown in FIG. 23:

1°—a circuit comprising the control 1, an impulse generator 65, the coil of the motor of the remote controlled display member (for example, 56 of FIG. 16 or 17) and the contact tracks 165 and 265 of the motors I and II, and 2°—an excitation circuit for the coil 256 of the motor II, which is circuit 1, 65, 256, 1 of FIG. 23.

For greater clarity, the tracks 165 and 265 of the motors I and II are shown concentrically on the diagram of FIG. 23, instead of being placed side by side as in FIGS. 23 and 22a.

When these two circuits are closed, the motor II starts to rotate, and its brush 266 rubs on the track 165, which permits the passage of impulses from 65 to 56 by 270–265–267–268–165–170. These impulses make the motor of the display member rotate to bring the desired symbol into the optical system (21–54, FIG. 17). When the end 268 of the brush 266 meets the interruption 171, the circuit 1° is cut, the impulses stop, and the display member and the drum thereof (63, FIG. 17) also stop; at this instant, the displayed sign is "G" as the drum 262–263 of the motor II has had to turn through the same arc *g* with respect to its zero starting position, which was formerly travelled by the drum 162–163 of the motor I under the influence of 7 impulses to come into the new position of the interruption 171. The circuit is designed so that, at this instant, the motor II also ceases to rotate. The return to zero of each of the motors can be effected by the interruptors 171 and 271 and the brushes 170 and 270.

It can be seen that a remote controlled display system, in accordance with the invention, can be constructed from the same essential elements, i.e., the motors of FIGS. 16, 17; these are the motors which serve, in turn, for the operation of the display members 55, 55' and for the memory devices of FIGS. 22, 23, which replace the storage 2 of FIG. 1.

Figure 24:
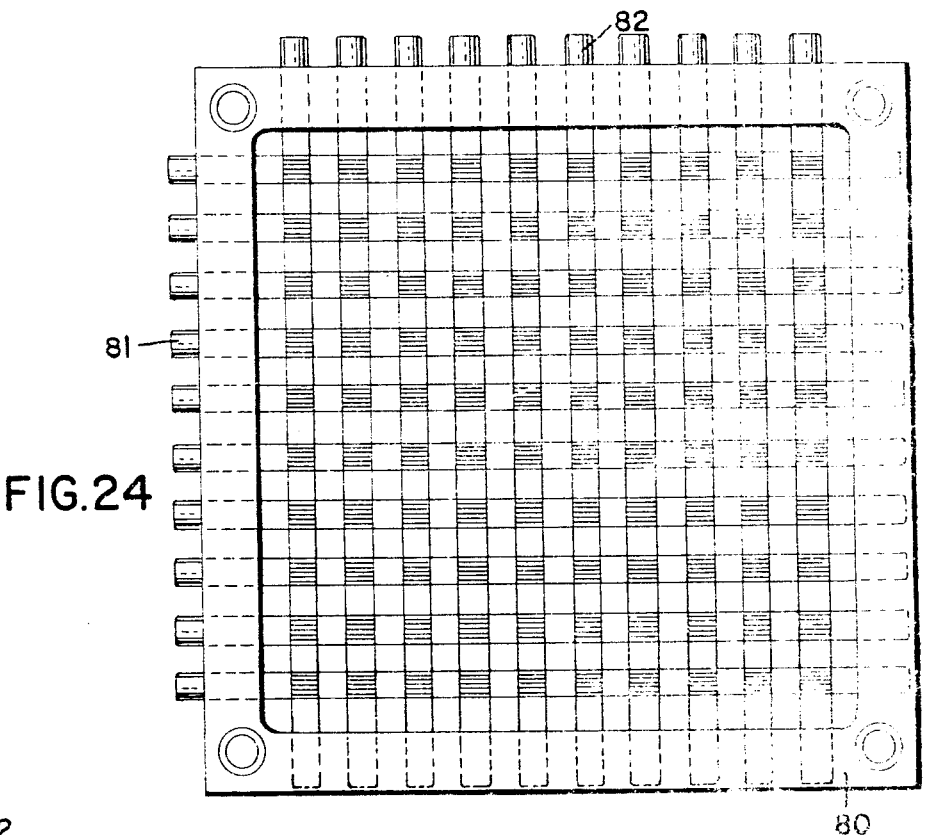
Figure 25:
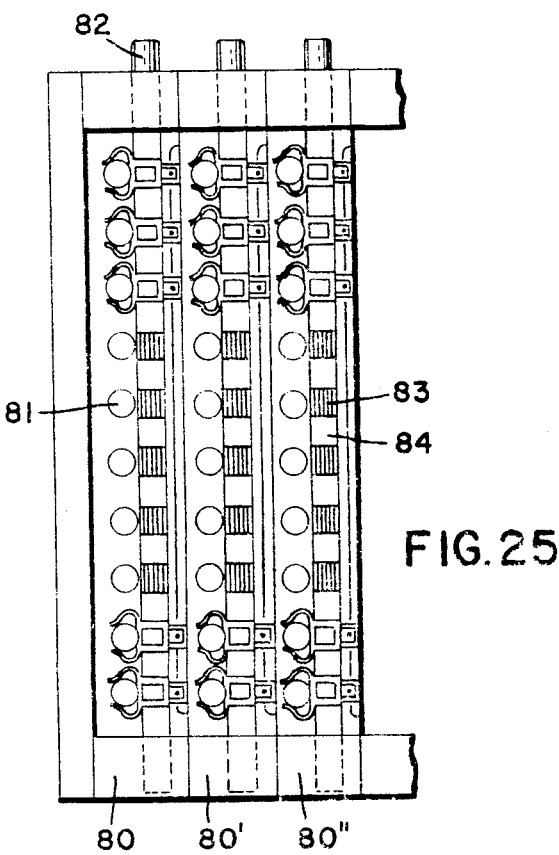

The motor described, as well as the memory device formed by the juxtaposition of two of these motors, can serve for other purposes. In the practice of remote control display, it might be important to be able to display, at the same time, a whole series of symbols previously inserted into the memory device. To effect this, a group of display members (such as 5 or 55, 55') with a group of memory devices, for example those of FIG. 22, are used. This function is required by the computer shown in FIGS. 24 and 25. The computer is constituted by frames 80, 80', 80'' etc., in which slide the contact rods 81 and similar rods 82 mounted at right angles to the first. Each rod comprises alternate conducting and insulating rings 83 and 84, respectively. At each crossing point of the rods, a sliding clip interconnects the rods. When the conducting rings 83 of the two rods are in coincidence, a circuit is closed through the clip.

The display members shown in the drawings comprise a casing enclosing the different working parts, such as the motor, film, optical system and the like. However, these parts can be mounted as assemblies directly on to the display panel without being enclosed in the casings previously referred to.

It is obvious that minor changes may be made in the form and construction of the invention without departing from the material spirit thereof. It is not, however, desired to confine the invention to the exact form shown and described, but it is desired to include all such as properly come within the scope claimed.

The invention having been thus described, what is claimed as new and desired to secure by Letters Patent is:

1. An illuminated display, comprising
   (a) a board having a number of juxtaposed sign elements, each sign element having an observation area,
   (b) a band located in each sign element carrying a series of indicia arranged seriatim,
   (c) a pulse-operated actuator for moving the band to bring the indicia sequentially to a position where the indicia appear on the observation area, the actuator being a stepping motor secured to a ratchet wheel, the teeth of which are engaged by two leaf springs fixed to the band, the band likewise being provided with peripheral teeth in which a leaf spring fixed to the wall of the sign element engages,
   (d) illumination means associated with each sign element and cooperating with the band to illuminate the indicia that resides at the observation area at any given time, the actuator comprising electromagnetic means operative in discrete increments of rotation in response to the receipt of electrical pulses to move the band, and
   (e) an optical system associated with each sign element for the projection of the indicia on the observation area.

2. An illuminated display, comprising
   (a) a board having a number of juxtaposed sign elements, each sign element having an observation area,
   (b) a band located in each sign element carrying a series of indicia arranged seriatim,
   (c) a pulse-operated actuator for moving the band to bring the indicia sequentially to a position where the indicia appear on the observation area, the said actuator being a stepping motor which carries cylindrical pole pieces alternately mounted on each of the side walls of its chassis and in which the field of the motor presents grooves serving as guides for the said pole pieces,
   (d) illumination means associated with each sign element and cooperating with the band to illuminate the indicia that resides at the observation area at any given time, the actuator comprising electro-magnetic means operative in discrete increments of rotation in response to the receipt of electrical pulses to move the band, and
   (e) an optical system associated with each sign element for the projection of the indicia on the observation area.

3. An illuminated display, comprising
   (a) a board having a number of juxtaposed sign elements, each sign element having an observation area,
   (b) a band located in each sign element carrying a series of indicia arranged seriatim,
   (c) a pulse-operated actuator for moving the band to bring the indicia sequentially to a position where the indicia appear on the observation area, the actuator being a stepping motor whose rotor carries an axially-extending crown which is concentric with the rotor axis and which carries the indicia,
   (d) illumination means associated with each sign element and cooperating with the band to illuminate the indicia that resides at the observation area at any given time, the actuator comprising electromagnetic means operative in discrete increments of rotation in response to the receipt of electrical pulses to move the band, and
   (e) an optical system associated with each sign element for the projection of the indicia on the observation area, the optical system including a support formed with a groove through which the crown passes as the rotor rotates.

4. An illuminated display, comprising
   (a) a board having a number of juxtaposed sign elements, each sign element having an observation area,
   (b) a band located in each sign element carrying a series of indicia arranged seriatim,
   (c) a pulse-operated actuator for moving the band to bring the indicia sequentially to a position where the indicia appear on the observation area, and
   (d) illumination means associated with each sign element and cooperating with the band to illuminate the indicia that resides at the observation area at any given time, the actuator comprising an electromagnet, the tubular inner part of which has helical grooves, while the rotor comprises helical splines which slide in the said grooves under the action of a spring, the rotor being connected by a system of double pawls to a toothed drum which moves the surface carrying the symbols.

References Cited

UNITED STATES PATENTS 2,103,761  12/1937  Wheeler et al.
2,258,952  10/1941  Hicks et al.

THOMAS B. HABECKER, Primary Examiner

U.S. Cl. X.R.

340—378